United States Patent [19]

Matsumoto

[11] 4,335,399
[45] Jun. 15, 1982

[54] NORMALIZING CIRCUIT FOR COLOR PRINTING SYSTEM

[75] Inventor: Fumio Matsumoto, Minami-ashigara, Japan

[73] Assignee: Fuji Photo Film Co., Ltd., Minami-ashigara, Japan

[21] Appl. No.: 159,620

[22] Filed: Jun. 16, 1980

[30] Foreign Application Priority Data

Jun. 18, 1979 [JP] Japan .................................. 54-76626

[51] Int. Cl.³ ............................................... G03F 3/00
[52] U.S. Cl. .......................................... 358/80; 358/75
[58] Field of Search ....................... 358/75, 76, 77, 78, 358/79, 80; 355/38

[56] References Cited

U.S. PATENT DOCUMENTS 4,189,742 2/1980 Klopsch ................................. 358/80
4,204,223 5/1980 Gast ........................................ 358/80

FOREIGN PATENT DOCUMENTS 53-145620 of 1978 Japan .

Primary Examiner—Michael A. Masinick
Attorney, Agent, or Firm—Fleit & Jacobson

[57] ABSTRACT

A normalizing circuit for conducting sensitivity correction and gamma correction by a coded signal from a computer. The coded sensitivity signal from a computer is D-A converted to an analog signal and put into an operational amplifier to be added to or subtracted from a density signal. The sensitivity corrected signal thus obtained is sent to a gamma correcting circuit. The gamma correcting circuit is composed of a plurality of analog switches, and a plurality of resistors connected in series or parallel with each other to be changed over by the analog switches. The analog switches are operated by the gamma correcting signal. An operational amplifier is controlled as to its gain by the resistance of the resistors connected with the input or the feed-back thereof.

12 Claims, 4 Drawing Figures

NORMALIZING CIRCUIT FOR COLOR PRINTING SYSTEM

BACKGROUND OF THE INVENTION

1. Field of the Invention

This invention relates to a color determining device for use in a color printing system, and more particularly to a normalizing circuit used for a color detecting device which detects and determines a particular color in a color original.

2. Description of the Prior Art

It has been proposed in a color printing system to print a particular color in a desirable color when the color original, like a color negative film or a color reversal film, contains a particular color such as flesh color like a human face, hands, legs or any other part of a human body.

In carrying out the above described method, a color determining or detecting device is used for determining if such a particular color exists in the color original, such device being as disclosed in Japanese Patent Publication (first publication) No. 53(1978)-145620.

The color detecting device disclosed therein measures the color components of red, green and blue of scanned points in the color original and normalizes the measured red, green and blue densities by conducting gamma correction and sensitivity correction according to the color original, and then determines if the color consisting of the normalized red, green and blue color components is contained in the region defined by a solid or plane area of the particular color like flesh color.

In the color determining device a normalizing circuit is used to normalize the red, green and blue densities of the point in the color original. The normalizing process is conducted for correcting the gamma value and the sensitivity according to the kind of the color original and the developing condition. In other words, even when the same object is photographed under the same photographing condition, the three color densities on the color original will differ for the different photosensitive materials according to the characteristics of the photosensitive material. Therefore, it is necessary to make the densities of the three colors the same, even for the different photosensitive materials, when the same object is photographed under the same condition. By conducting such normalization, the determination of the color can be accurately made.

The conventional normalizing circuit has a defect in that the addition, subtraction and gain conversion are made by externally turning on and off a switch, and accordingly the operation of the switch for the process is troublesome.

SUMMARY OF THE INVENTION

The object of the present invention is to provide a normalizing circuit which can be easily operated.

A more specific object of the present invention is to provide a normalizing circuit for color determination in a color printing system in which the switch can easily be operated.

The normalizing circuit in accordance with the present invention is characterized in that the coded sensitivity signal sent from a computer is D-A converted, the obtained analog signal is put into an operational amplifier to conduct addition or subtraction together with a density signal input from the other input terminal thereof, and the sensitivity (base) corrected density signal thus resulting is forwarded to a gamma correcting circuit for conducting gamma correction.

The gamma correcting circuit for correcting the gamma, i.e., the relationship between exposure and density, is composed of a plurality of analog switches which are operated by gamma correcting signals sent from a computer in a coded form, an input or feed-back resistor array consisting of a plurality of resistors connected in series or parallel with each other which are changed over by these analog switches, and an operational amplifier, the gain of which is controlled by the resistance of the resistor array.

DESCRIPTION OF THE PREFERRED EMBODIMENTS

Figure 1:
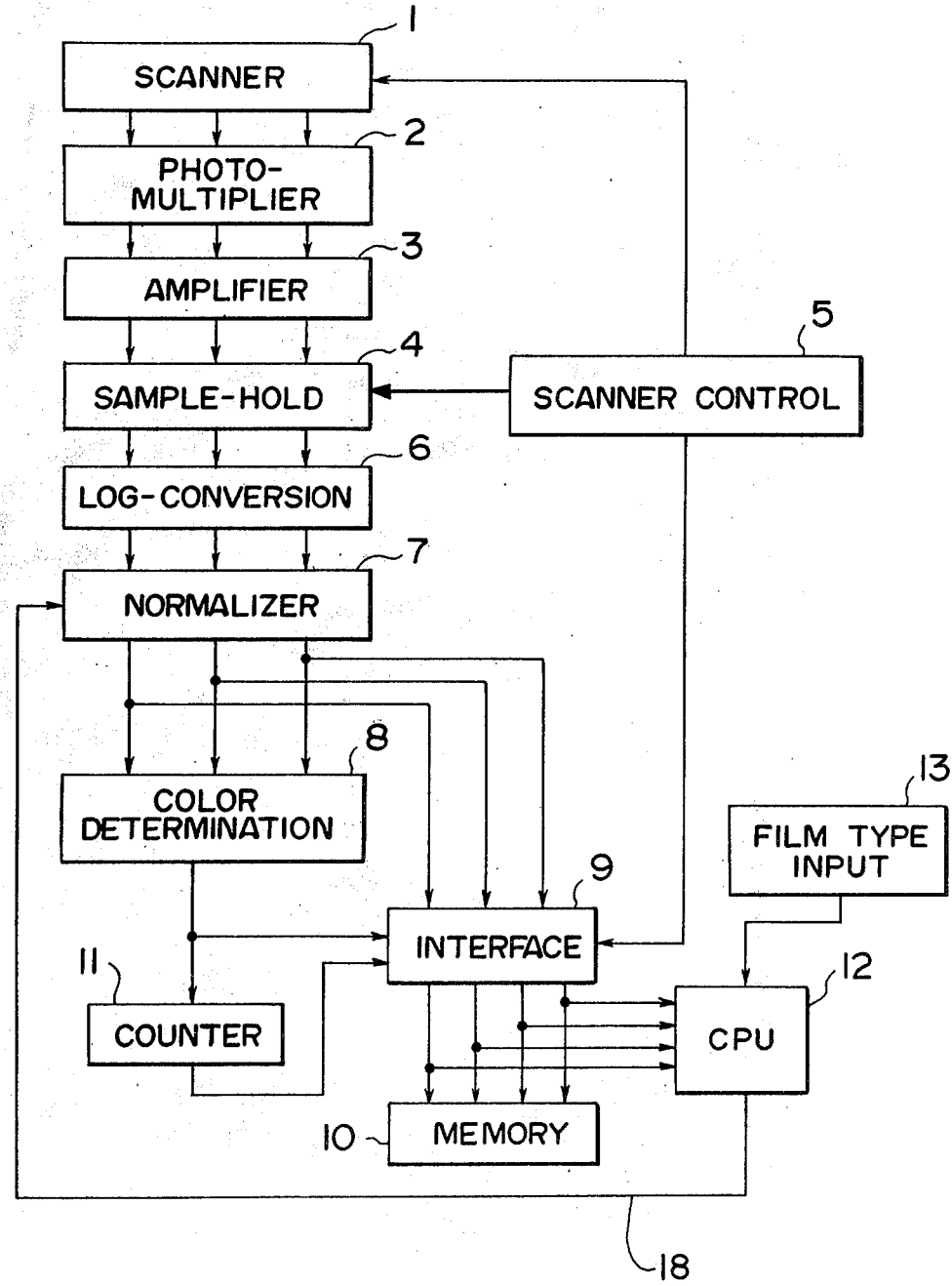
FIG. 1 is a block diagram showing the color determining circuit in which the normalizing circuit is used.

Referring to FIG. 1, a color original is scanned by a scanner 1 and the light transmitted through or reflected by the color original image is separated into red, green and blue components by a color separation optical system. The light separated into the three color light components is measured by a photomultiplier 2 for each of the color components.

The measured signal at the photomultiplier 2 is amplified by an amplifier 3 for each of the color components, and is then subjected to a sample-and-hold operation by a sample-hold circuit 4. The sample-hold circuit 4 is controlled by a sampling pulse from a scanner control circuit 5. Since the scanner control circuit 5 also controls the scanning section of the scanner 1, the sampling is conducted in synchronization with the scanning. Thus, the measurement is conducted for the measuring points arranged regularly on the image of the color original.

The measured signal representing the red, green and blue of the sampled measuring points is sent to a log-conversion circuit 6. The measured signal is log-converted by the log-conversion circuit 6 and red density R, green density G and blue density B are obtained. In practice, log (1/T) is obtained where T is the transmittivity.

The three color component densities R, G and B are sent to a normalizing circuit 7, and the gamma value and the sensitivity are corrected in accordance with the kind of film. The three color component densities R, G and B normalized by the normalizing circuit 7 are sent to a color determination circuit 8 and a determination is made to determine if the color at the measured point is included in a predetermined region of the particular color.

When the color is determined as the particular color like flesh color, a signal "1" is output from the color determination circuit 8. When the color is determined not to be the particular color, a signal "0" is output from the color determination circuit 8. The flag showing the determined result and the three color component densities R, G and B are sent to an interface 9, and are memorized in a memory 10 at the address appointed by a measuring point signal from the scanner control circuit 5.

A counter 11 counts the "1" outputs from the color determination circuit 8 and counts the number of the measuring points determined as being of the particular color.

When the number of the measured points determined as being of the particular color counted by the counter 11 is proved to be over a predetermined number, the data is read out of the memory 10. At this stage, since the data together with its flag is memorized at a predetermined address in memory 10, only the data whose flag is "1" is read out by a CPU 12, where the average density of the three color component densities is calculated.

The CPU 12 is provided with a signal from a film type input means 13. By this signal the address of the memory is appointed, and the gamma correcting signal and the sensitivity correcting signal memorized in advance there are read out and sent to the normalizing circuit 7 over data bus 18.

The exposure time control information calculated by the CPU is sent to the exposure control portion of a color printer, and the exposure value is controlled so that the color paper is printed in accordance with the aimed color densities. Therefore, in the case of the flesh color, the human face or the like is printed in the color as observed by the naked eye. When the number of the measured points determined as being of the particular color is under the predetermined number, the color printing process may be conducted by the conventional LATD system.

Figure 2:
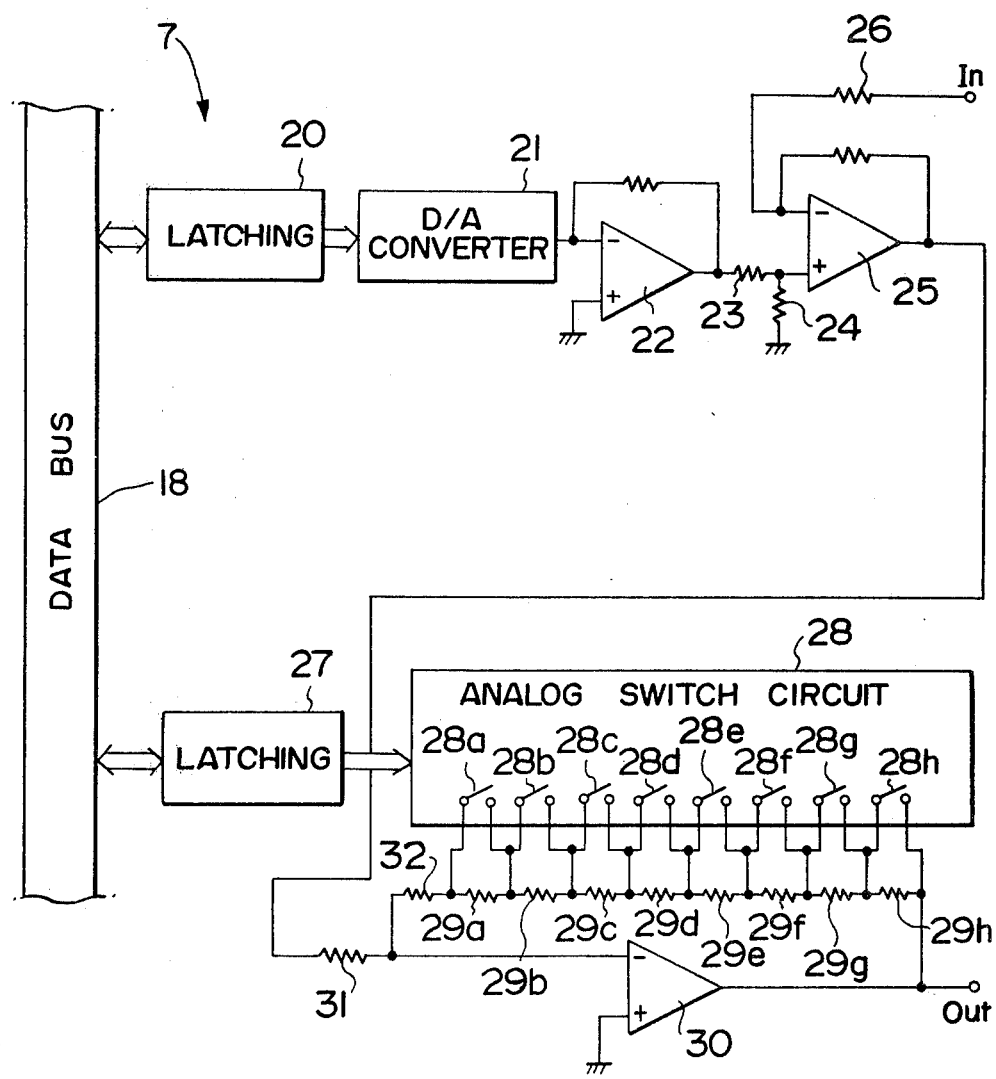
FIG. 2 is a block diagram showing an example of a normalizing circuit in accordance with the present invention.

FIG. 2 shows an example of a normalizing circuit. The normalizing circuit 7 consists of three circuit for red, green and blue. For the sake of convenience of explanation, only one of them will be described in detail since they are all the same.

A latching circuit 20 is connected with the data bus line 18 for latching the sensitivity correcting signal of 8 bits sent from the CPU 12. The latched sensitivity correcting signal is converted to an analog signal by a D-A converter 21 and provided as an electric current output. The electric current output is provided to an operational amplifier 22 and is converted to a voltage within the range as shown in Table 1.

TABLE 1

| Output of the operational amplifier 22 | Density value |
|---|---|
| 0 to −10 (V) | 0 to −3.33 |

The resolving power is −39 mV, which corresponds to a density of −0.013.

The output voltage of the operational amplifier 22 is divided by resistors 23 and 24, and the divided voltage is provided to the positive (+) input terminal of an operational amplifier 25 constituting a differential amplifier.

On the other hand, the negative (−) terminal of the operational amplifier 25 is provided with a density signal from the log-conversion circuit 6 through a resistor 26. Therefore, at the operational amplifier 25, the density signal is added with a desired constant corresponding to the difference between the two input signals, whereby the sensitivity correction is conducted.

The gamma correcting signal sent from the data bus line 18 is latched by a latching circuit 27, on the other hand. By means of the digital signal of the latching circuit 27, an analog switch circuit 28 is operated.

The analog switch circuit 28 is provided with a plurality of analog switches 28a to 28h. The analog switches 28a to 28h are connected in parallel to resistors 29a to 29h which are connected in series. The series of resistors 29a to 29h is used as a feedback circuit of an operational amplifier 30.

Therefore, at the operational amplifier 30, the gain is controlled according to the ratio of the resistor 31 and the feedback resistor series 29a to 29h, and the sensitivity corrected density signal is amplified by a desired gain to correct the gamma value.

In other words, by successively turning on the analog switches 28a to 28h according to the gamma correcting signal, the gain is controlled. By making the resistance of the resistors 100 K$\Omega$ for resistor 31, 100 K$\Omega$ for 32, 1 K$\Omega$ for 29a, 2 K$\Omega$ for 29b, 4 K$\Omega$ for 29c, 8 K$\Omega$ for 29d, 16 K$\Omega$ for 29e, 32 K$\Omega$ for 29f, 64 K$\Omega$ for 29g and 128 k$\Omega$ for 29h, the gain changes as shown in Table 2 below.

TABLE 2

| Gain changes | Analog switch circuit |
|---|---|
| 1.0 | All analog switches are turned ON |
| 3.55 | All analog switches are turned OFF |

The resolving power is 0.01 (1 K/100 K).

Figure 3:
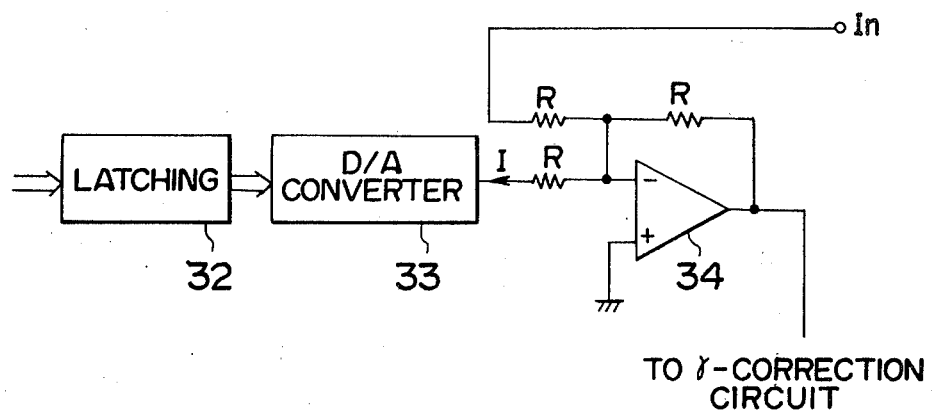
FIG. 3 is a block diagram showing an example of a sensitivity correcting circuit.
Figure 4:
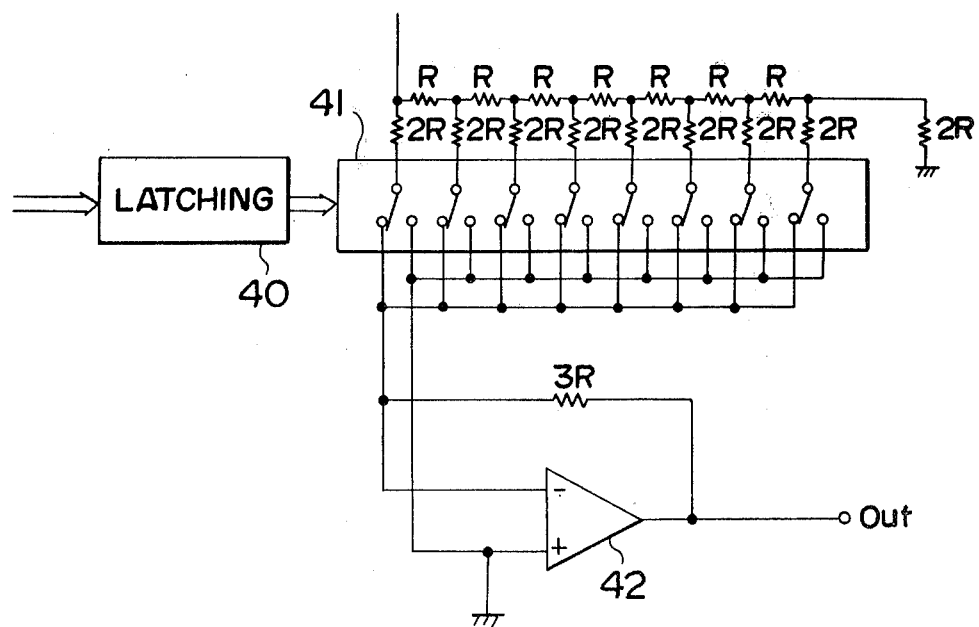
FIG. 4 is a block diagram showing an example of a gamma correction circuit.

The sensitivity correcting circuit and the gamma correcting circuit, as shown in the embodiment of FIG. 2 above, can be replaced by other types shown in FIGS. 3 and 4, respectively.

The sensitivity correcting circuit (upper portion) of FIG. 2 can be replaced by the circuit shown in FIG. 3. In this case, the current-voltage conversion is not made, the output current of the D-A converter is directly provided to an operating circuit, and accordingly an amplifier for conversion is not needed.

The gamma correcting circuit (lower portion) of FIG. 2 can be replaced by the circuit shown in FIG. 4. In this case, the number of the kinds of resistors used is very small, and accordingly the manufacture thereof is made very simple. In FIG. 4, the gain changes as shown in Table 3 when R = 10 K$\Omega$.

TABLE 3

| Gain changes | Analog switch circuit |
|---|---|
| 0 | All switches are in normal close. |
| 3 | All switches are in normal open. |

I claim:

1. A normalizing circuit for conducting sensitivity correction and gamma correction in accordance with a sensitivity correcting signal and a gamma correcting signal from a computer, and in accordance with a density signal, comprising:

first latching means for latching said sensitivity correcting signal from said computer, D-A converter means connected to said first latching means for converting the latched sensitivity correcting signal into an analog signal comprising an output current, current-voltage conversion means connected to said D-A converter means for converting the output current of the analog signal of the D-A converter means to a voltage output, first operational amplifier means connected to said current-voltage conversion means for combining the signal from the current-voltage conversion means with said density signal to provide an amplifier output signal, second latching means for latching said gamma correcting signal from said computer, an analog switch circuit connected to said second latching means and comprising a plurality of analog switches switchably operated by the latched gamma correcting signal, a resistor array comprising a plurality of resistors connected to said analog switches so as to be selectively connected in series or in parallel with each other as selectively connected by said analog switches, and second operational amplifier means connected to said first operational amplifier means for amplifying the amplifier output signal from said first operational amplifier means, said second operational amplifier means being connected to said resistor array.

2. A normalizing circuit as defined in claim 1, wherein the amplifier output signal of said first operational amplifier means is provided as an input to the second operational amplifier means by way of said resistor array.

3. A normalizing circuit as defined in claim 1, wherein said first operational amplifier means additively combines the signal from the circuit-voltage conversion means with said density signal.

4. A normalizing circuit as defined in claim 1, wherein said first operational amplifier means subtractively combines the signal from the circuit-voltage conversion means with said density signal.

5. A normalizing circuit as defined in claim 1, said second operational amplifier means having an input to which said resistor array is connected.

6. A normalizing circuit as defined in claim 1, said second operational amplifier means having a feed-back circuit to which said resistor array is connected.

7. A normalizing circuit for conducting sensitivity correction and gamma correction in accordance with a sensitivity correcting signal and a gamma correcting signal from a computer, and in accordance with a density signal, comprising:

first latching means for latching said sensitivity correcting signal from said computer, D-A converter means connected to said first latching means for converting the latched sensitivity correcting signal into an analog signal, first operational amplifier means connected to said D-A converter means for combining the signal from the D-A converter means with said density signal to provide an amplifier output signal, second latching means for latching said gamma correcting signal from said computer, an analog switch circuit comprising a plurality of analog switches operated by the latched gamma correcting signal, a resistor array comprising a plurality of resistors connected to said analog switches so as to be selectively connected in series or in parallel with each other, as selectively connected by said analog switches, and second operational amplifier means connected to said first operational amplifier means for amplifying the amplifier output signal from said first operational amplifier means, said second operational amplifier means being connected to said resistor array.

8. A normalizing circuit as defined in claim 7, wherein the amplifier output signal of said first operational amplifier means is provided as an input to the second operational amplifier means by way of said analog switch circuit.

9. A normalizing circuit as defined in claim 7, wherein said first operational amplifier means additively combines the signal from the D-A converter means with said density signal.

10. A normalizing circuit as defined in claim 7, wherein said first operational amplifier means subtractively combines the signal from the D-A converter means with said density signal.

11. A normalizing circuit as defined in claim 7, said second operational amplifier means having an input to which said resistor array is connected.

12. A normalizing circuit as defined in claim 7, said second operational amplifier means having a feed-back circuit to which said resistor array is connected.

* * * * *